H. E. ELLIS.
CATERPILLAR TRACTOR SWAMP HARVESTER.
APPLICATION FILED JAN. 10, 1919.
1,344,624.
Patented June 29, 1920.
4 SHEETS—SHEET 1.
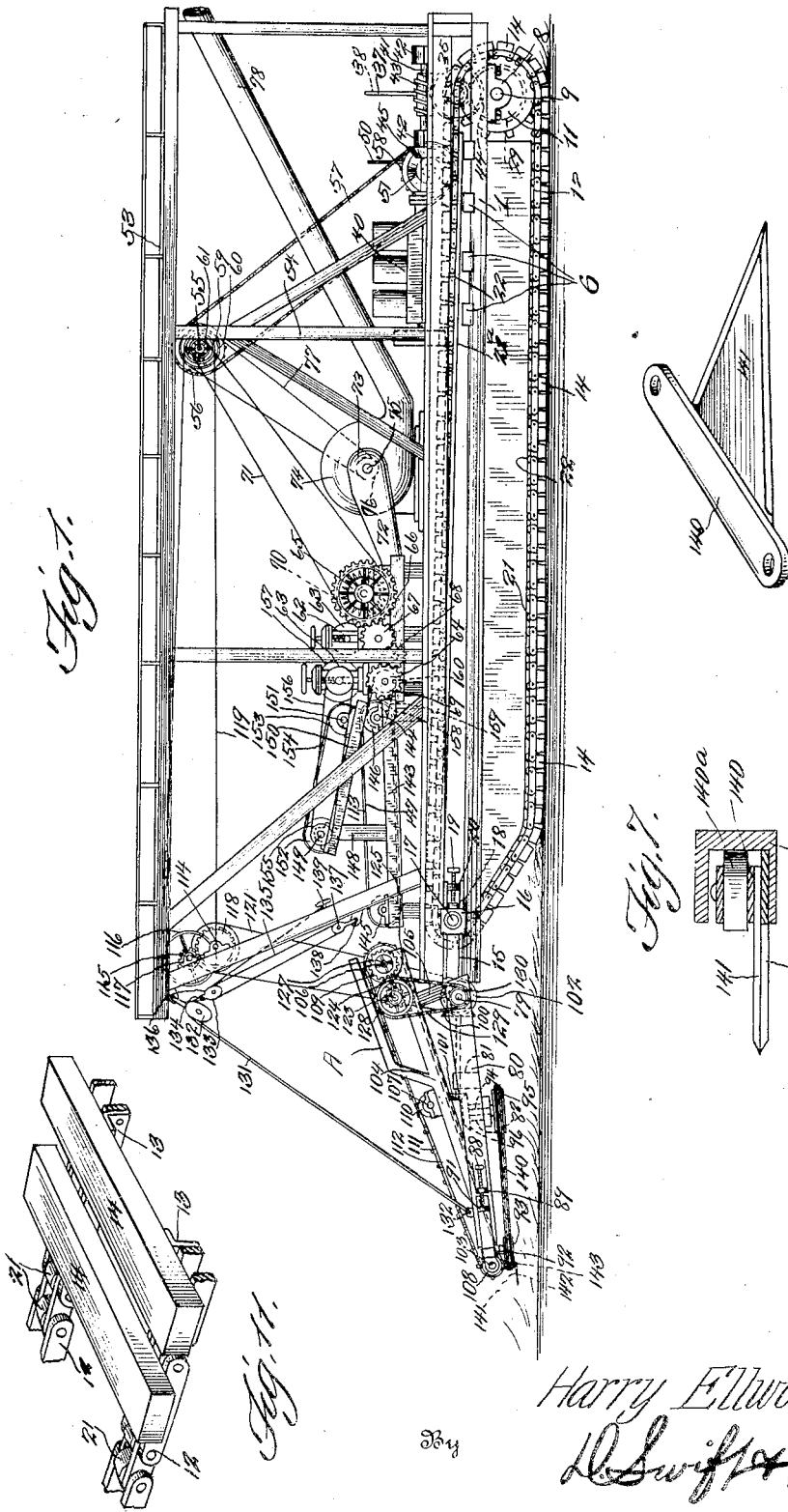
Inventor
Harry Ellwood Ellis,
By
Attorneys H. E. ELLIS.
CATERPILLAR TRACTOR SWAMP HARVESTER.
APPLICATION FILED JAN. 10, 1919.
1,344,624.
Patented June 29, 1920.
4 SHEETS—SHEET 2.
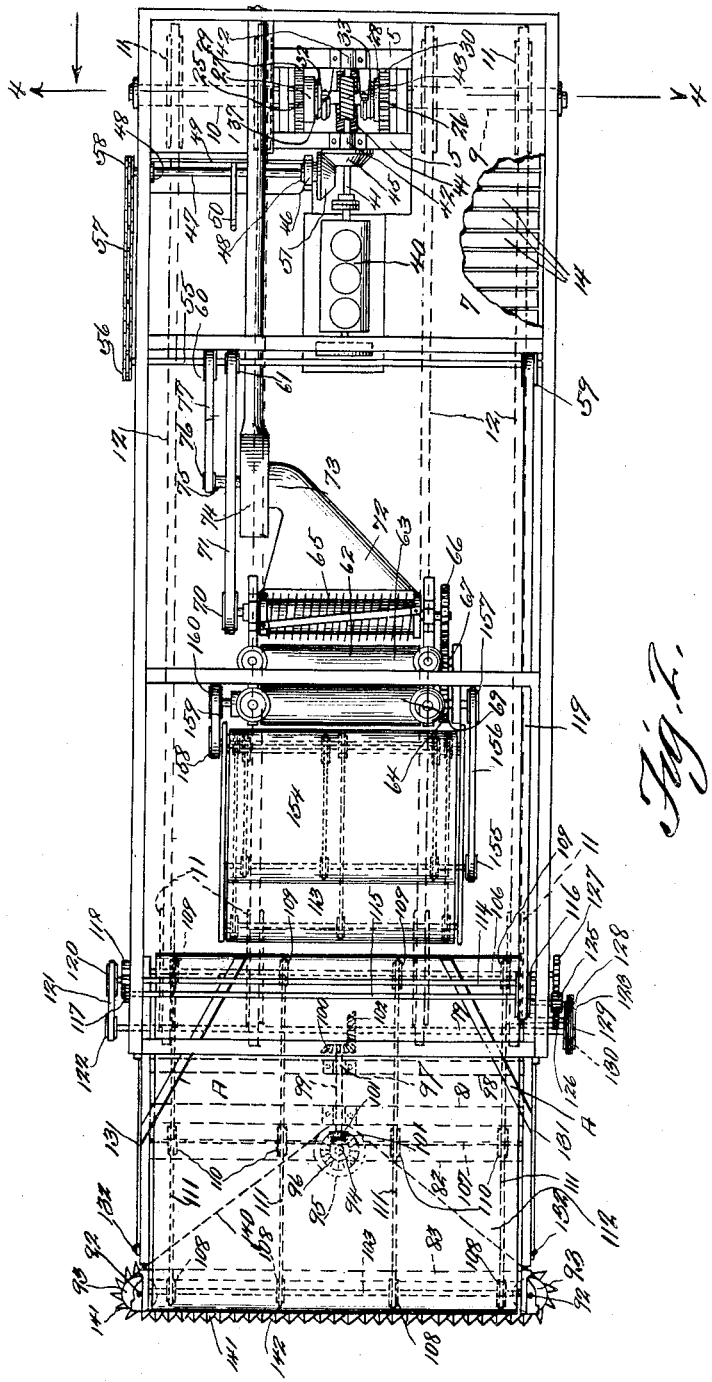
Inventor
Harry Ellwood Ellis,
By
D. Swift & Co., Attorneys

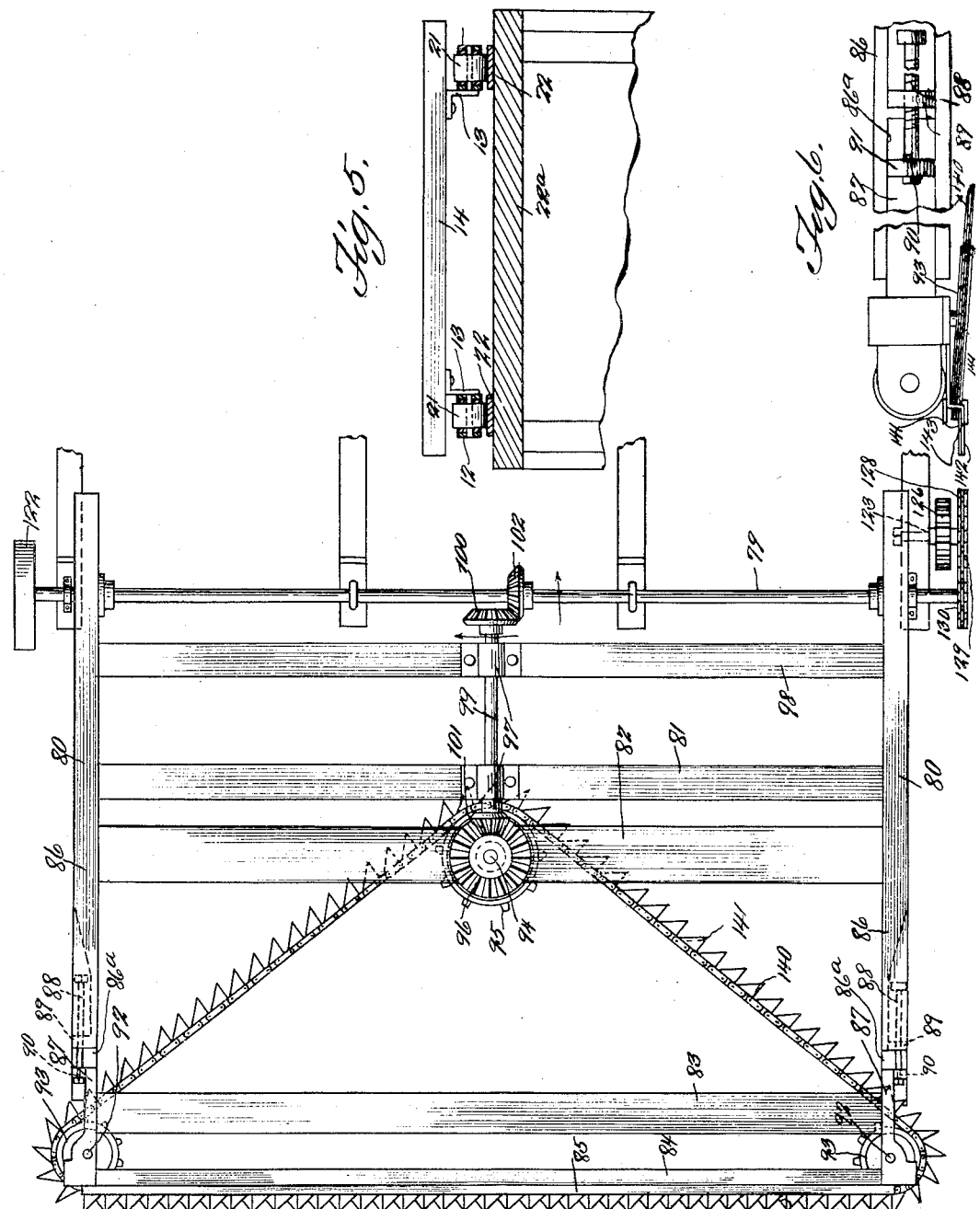

H. E. ELLIS.
CATERPILLAR TRACTOR SWAMP HARVESTER.
APPLICATION FILED JAN. 10, 1919.
1,344,624.
Patented June 29, 1920.
4 SHEETS—SHEET 4.
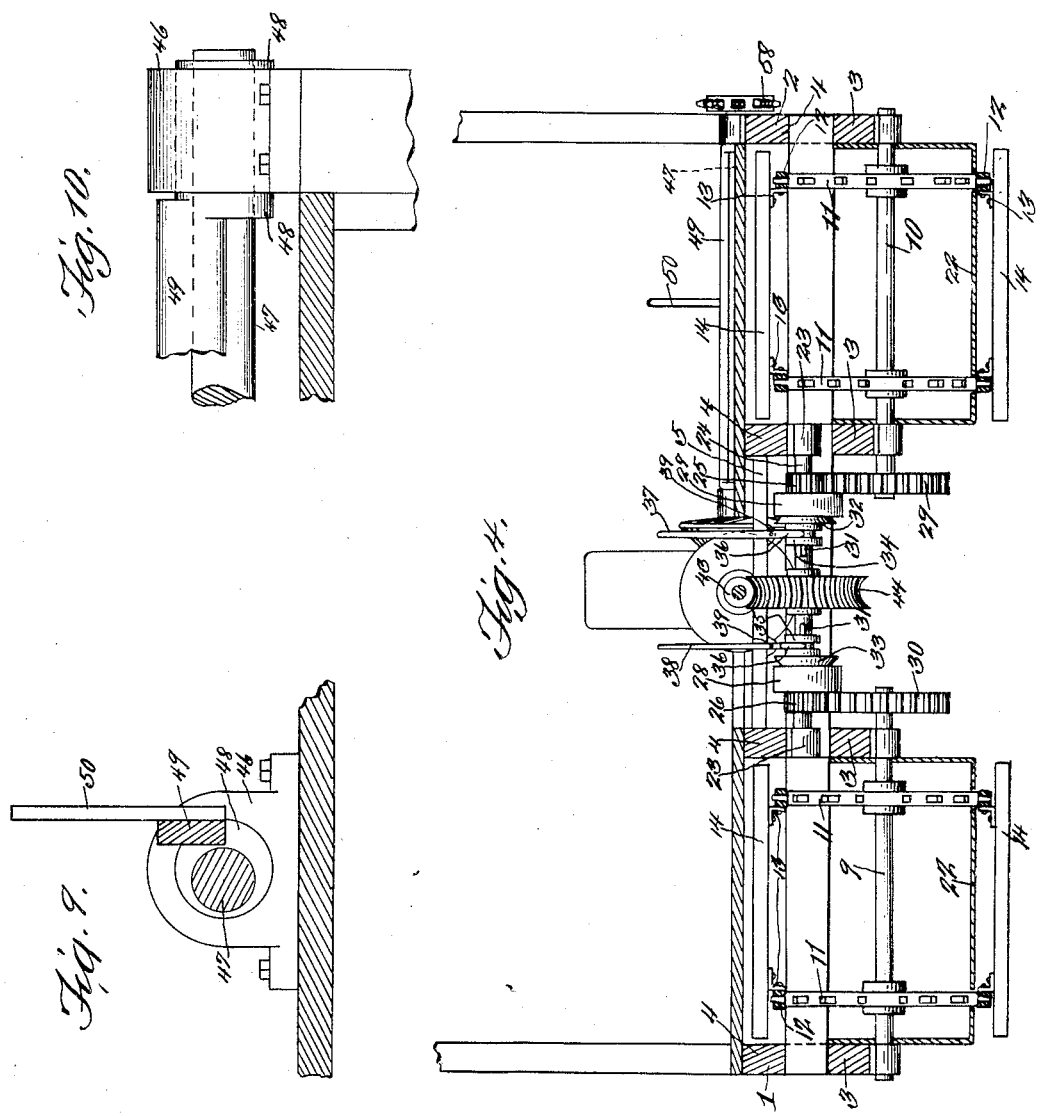
Inventor
Harry Ellwood Ellis,
By D. Swift & Co.
Attorneys

UNITED STATES PATENT OFFICE.

HARRY ELLWOOD ELLIS, OF LEESBURG, FLORIDA.

CATERPILLAR-TRACTOR SWAMP-HARVESTER.

1,344,624.   Specification of Letters Patent.   Patented June 29, 1920.

Application filed January 10, 1919. Serial No. 270,506.

*To all whom it may concern:*

Be it known that I, HARRY ELLWOOD ELLIS, a citizen of the United States, residing at Leesburg, in the county of Lake, State of Florida, have invented a new and useful Caterpillar-Tractor Swamp-Harvester; and I do hereby declare the following to be a full, clear, and exact description of the invention, such as will enable others skilled in the art to which it appertains to make and use the same.

This invention relates to an improved swamp harvester, and one of the objects of the invention is to provide a machine for cutting or harvesting reeds or grasses growing in swampy lands or shallow water, and so constructed as to harvest the reeds or grasses only.

A further object of the invention is to provide caterpillar tractor means whereby the machine may traverse the swampy lands and in shallow water and to so construct the entire machine and mount the caterpillar tractor thereon, as to render the machine capable of floating in the event of getting in deep water.

A further object of the invention is to provide a harvesting means on the forward end of the machine said harvesting means comprising a revoluble chain having cutting teeth movable over and coöperating with a toothed bar, whereby the reeds or grasses may be easily harvested or cut, and in such wise as not to injure the roots.

A further object of the invention is the provision of means for operating the cutting tooth chain.

A further object of the invention is to provide a conveyer superimposed with relation to the cutter chain, whereby as the reeds or grasses are cut they will fall longitudinally on the conveyer, to be transferred to a shredding mechanism.

The invention aims to provide means for simultaneously slacking or tightening the conveyer and the cutter chain.

The invention further aims to provide means on the frame of the machine for flattening out the grass or reeds preparatory to entering the shredding mechanism.

The invention further aims to provide means for carrying off the shredded material and discharging the same to the rear into a trailer, which may subsequently carry the material to a pulping plant or apparatus, such as those set forth, illustrated and claimed in the patents to H. E. Ellis of August 7, 1917, Numbers 1,236,072, and 1,236,370, and the co-pending application filed the 7th day of February, 1919, Serial No. 275,661.

A further object of the invention is to provide means for furnishing power to the caterpillar tractor, the harvesting mechanism, the conveyers and shredding mechanism, there being provision of means made whereby said parts may operate coordinately, and whereby said mechanisms may be thrown into and out of gear with the source of power.

In practical fields the details of construction may necessitate alterations, falling within the scope of what is claimed.

The invention comprises further features and combination of parts, as hereinafter set forth, shown in the drawings and claimed.

In the drawings:—

Figure 1 is a view in side elevation of the improved caterpillar tractor swamp harvester, constructed in accordance with the invention.

Fig. 2 is a plan view of the same.

Fig. 3 is a plan view of the harvesting mechanism, for mowing the reeds or grass in swampy lands.

Fig. 4 is a transverse sectional view on line 4—4 of Fig. 2.

Fig. 5 is a transverse sectional view of a portion of the caterpillar tractor means.

Fig. 6 is an enlarged detail view of a portion of the harvesting means, showing the means whereby a portion of the frame of the harvesting or cutting means may be adjusted for taking up the slack in the cutting chain and the conveyer above the same.

Fig. 7 is a detailed sectional view of the channel for the forward part of the cutter chain.

Fig. 8 is a detail view of one of the teeth of the cutter chain.

Fig. 9 is a detailed sectional view of a counter shaft, which is mounted in an eccentric bearing whereby the friction drive mechanism between the source of power and the various mechanisms on the frame of the machine may be thrown in and out of gear with the source of power.

Fig. 10 is a view in elevation of the structure shown in Fig. 9.

Fig. 11 is an enlarged detailed view of a portion of one of the caterpillar chains and the connecting bars, Referring more especially to the drawings 1 and 2 designate a pair of similar pontoons which comprise the longitudinally extending parallel side bars 3 and 4, the latter being superimposed with relation to the former. These pontoons are connected by the cross bars or timbers or braces 5 and 6, thereby providing a rigid frame, on which a deck or platform 7 is mounted. Journaled in suitable bearings 8 at the rear of the frame, that is on the lower timbers or bars of the pontoon, are axially alined shafts or axles 9 and 10, which are provided with sprockets 11. Engaging the sprockets are chains 12, arranged in pairs, one pair for each pontoon. Carried by the links of the chains are angle plates 13. Wooden timbers or bars 14 are secured to the angle plates, thereby connecting the chains of each pair. These bars or timbers extend at right angles to the line of travel to the chains, and form a substantially closed platform, traveling with the chains, and constituting a caterpillar tractor or drive for the machine. Mounted in guides 15 of the upper and lower timbers of the forward ends of the pontoons are bearing cross heads 16, in which the axially alined forward shafts 17 are journaled. Swiveled to the cross head bearings as at 18, as shown in Fig. 1, are screws 19, which are threaded into the members 20. It is obvious that by adjusting the screws 19 the bearing cross head may be moved forwardly or rearwardly in order to loosen or tighten the tractor chains. The tractor chains are of the roller type, the rollers 21 thereof travel on suitable metal tracks 22. Mounted in bearings 23 of the adjacent upper longitudinally extending timbers of the pontoons is a driven shaft 24, loose upon which are the pinions 25 and 26, upon the inner faces of which female friction cones 27 and 28 are provided. The pinions 25 and 26 mesh with the gears 29 and 30 of the shafts or axles 10 and 11. Made fast by the keys 31 on the shaft 24 are friction clutch male cones 32 and 33, the grooved collars 34 and 35 of which are engaged by the forks 36 of the levers 37 and 38, which are pivoted at 39 to one of the cross timbers 5 as shown in Fig. 4. Carried by the frame of the machine is a conventional form of internal combustion engine 40, the driving shaft 41 of which is mounted in the bearings 42 of two of the cross timbers 5 of the rear end of the frame. This driving shaft is provided with a worm 43, which meshes with the worm wheel 44 which is fast upon the shaft 24. It is obvious that since the driving shaft is in gear with the counter shaft 24 through the medium of the worm and worm wheel, and owing to the provision of the friction clutch drive mechanism, power may be transmitted to the caterpillar tractor means. Further by lessening the friction between the clutch members 27 and 32, or that is throwing them out of clutch, the machine may be turned to the right. By increasing the friction between or throwing the clutch members 27 and 32 in gear, and decreasing the friction between or throwing the clutch members 28 and 33 out of gear, the machine may be turned to the left. By keeping both sets of clutch members in gear, the machine may travel straight ahead. Also fast with the driving shaft 41 is a friction cone gear 45, the purpose of which will appear. Mounted on the upper timbers 4 of the right hand side of the pontoon are bearings 46. A counter shaft 47 is provided. This shaft 47 is supplied with eccentrics 48, the bearings for the inner eccentric is on an extension of the inner timber of the right hand pontoon. These eccentrics are mounted in the bearings 46, and are connected by the transverse bar 49 provided with a handle 50. It is obvious that by moving the handle 50, thereby rocking the eccentrics simultaneously, the position of the countershaft 47 may be changed. The inner end of the countershaft has fast thereto a friction cone gear 51, which coöperates with the friction cone gear 45. It is clear that by adjusting the eccentrics simultaneously, the friction cone gear 51 may be moved in and out of coöperation with the friction cone gear 45, the purpose of which will be hereinafter obvious. Mounted upon the pontoons or frames is a superstructure or frame 53. Mounted in suitable bearings of corresponding uprights 54 of this superframe is a countershaft 55. On one end of the countershaft 55 is a sprocket 56, which is engaged by the sprocket chain 57, which engages and passes about the sprocket 58 of the counter shaft 47. On the opposite end of the shaft 55 is a pulley 59, and also carried by the shaft 55 are the pulleys 60 and 61. Mounted upon the deck or platform connecting the two pontoons is a conventional form of combined crusher and shredder mechanism 62, which is set forth, illustrated and claimed in said copending application. However, this combined crusher and shredder in general comprises the upper and lower series of crushing rolls 63 and 64, and the shredding cylinder or roll 65. These rolls and cylinder are in gear, by means of the gears 66, 67, 68 and 69. On one end of the shaft of the cylinder 65 is a pulley 70, about which a belt 71 engages. This belt passes about the pulley 61, consequently the combined crusher and shredder is driven from the counter shaft 55. After the swamp grass, such as reeds and the like, have been crushed and shredded, it is the aim to provide suction means for carrying off the shredded material. This means comprises a funnel shaped chute 72, the smaller end 73 of which forms a part of the casing of the suction fan 74, which is carried by the frame of the machine. The shaft 75 of the fan (not shown but carried within the casing) carries a pulley 76, which is engaged by the belt 77, which passes over the pulley 60 of the counter shaft 55, which transmits power to the fan, which creates a suction, thereby drawing the shredded material through the chute, and forcing the same through the outlet conduit 78, from the outlet end of which (not shown), the material is discharged into a suitable trailer (not shown), which may subsequently carry the material to a conventional form of plant, which is set forth in the said copending application. Mounted in suitable bearings of the forward end of the machine, that is, the pontoons, is a shaft 79, on the ends of which the side bars 80 of the cutting or harvesting mechanism are pivotally mounted. The side bars of the frame of the harvesting or cutting mechanism are connected by the cross pieces 81, 82 and 83 and 84. The cross piece 84 carries a channel member 85, shown in detail in Fig. 7. Each side bar of the frame of the cutting mechanism comprises two sections 86 and 87, which are adjustably connected. To adjustably connect these parts, a screw 88 is threaded in a bearing 89, and one end of the screw is swiveled at 90 in a bearing 91. As shown in Fig. 3 there are two screws, one on each side, and by adjusting the screws, the sections 87 of the side bars of the cutting or harvesting mechanism frame may be adjusted. The sections 87 of this frame are connected by the transverse bars 83 and 84. Mounted in bearings of the sections 87 of the frame of said harvesting or cutting mechanism are stub shafts 92 provided with sprockets 93. Mounted in a bearing of the cross bar 82 and centrally thereof is a stub shaft 94, the lower end of which carries a sprocket 95, and the upper end of which carries a bevel gear 96. Mounted in bearings 97 of the cross pieces 81 and 98 is a shaft 99, one end of which has a bevel gear 100 and its other end a bevel pinion 101. The beveled gear 100 meshes with a beveled gear 102 of the shaft 79. Journaled in bearings of and arranged horizontally with relation to the sections 87 is a shaft 103, which also passes through the side bars of the superimposed conveyer frame 104. This conveyer frame is supported on an angle with relation to the harvesting or cutting mechanism frame by the supports 105. Journaled in bearings of the rear ends of the sides of the conveyer frame is a shaft 106, and also in bearings of the sides of the conveyer frame intermediate their ends is a shaft 107. These shafts 103, 106 and 107 are provided with sprockets 108, 109 and 110, which are engaged by the sprocket chains 111. Secured to these chains is a canvas conveyer belt 112, upon which the swamp grass, such as reeds and the like, fall as they are cut or harvested. The grass falls longitudinally with the travel of the conveyer, so as to be transferred endwise and be forced inwardly on the conveyer belt 112 by means of rearwardly and inwardly extending members A, which members are carried by the bars 104 and rise upwardly therefrom and overlie the conveyer belt 112 and form means for causing all of the harvested material to be deposited on to the transferring conveyer 113, which will deliver the grass to the combined crusher and shredder. Mounted in bearings of correspondingly opposite inclined beams of the superframe or structure are shafts 114 and 115, and on one end of the shaft 115 a pulley 116 is made fast. The other end of the shaft 115 carries a pinion 117, which is in mesh with the gear 118, which is mounted on the shaft 114. The pulley 116 is engaged by a belt 119, which engages about the pulley 59. On one end of the shaft 114 a sprocket 120 is fixed, there being a socket chain 121 engaging the same, and also engaging a sprocket 122 on the shaft 79. Obviously that by means of the countershaft 55 power is transmitted to the cutting or harvesting mechanism, through the medium of the belt 119, the pinion and gear 117 and 118, and the sprocket chain 121. Mounted in bearings of the sides of the conveyer frame 104 are shafts 123 and 124. The shaft 124 is a stub shaft and carries a pinion 125, which meshes with a pinion 126 on the shaft 123. The pinion 125 also meshes with a gear 127 on the shaft 106. On one end of the shaft 123 is a sprocket 128, which is engaged by a chain 129, which also passes about a sprocket 130 of the shaft 79. It is apparent that by means of this gearing, the conveyer of the frame 104 also receives its power from the counter shaft 55, through the medium of the connection between the shaft 79 and the shafts 106, 123 and 124. Suitable cables 131 are connected at 132 to the forward parts of the sides of the conveyer frame 104. These cables pass over the pulleys 132 and are connected to the block and tackle pulleys 133 as at 134. Ropes or pulleys 135 engage about the pulleys 133, their ends being connected to the casings of said pulleys 133 as at 136, and also pass over the pulleys 137, which are connected at 138 to the superframe. The other end parts of said cables 135 are adapted to be wrapped about or anchored to the dogs 139. By means of these cables the cutting or harvesting mechanism and the superimposed conveyer may be tilted, in fact raised and lowered pivotally on the shaft 79. A sprocket chain which is endless, passes about the sprockets 93 and 95, and travels through the channel member 85. This sprocket chain 140 is provided with suitable cutting teeth 141, thereby constituting a saw tooth cutting chain. These teeth coöperate with similar cutting teeth 142 of the stationary bar or plate 143 of the adjustable section of the cutting mechanism frame.

It is obvious that the chain carrying cutting teeth is given a continuous revoluble movement, and by its teeth coöperating with the teeth 144 the swamp grass is severed as the machine moves forwardly through the swampy lands. Mounted upon the deck or the platform of the machine is a frame 143, in bearings of which the shafts 144 and 145 are mounted. These shafts carry sprockets 146, about which the sprocket chains 147 engage. These sprocket chains carry the canvas transferring conveyer 113. Rising upwardly from the frame 143 are oppositely disposed uprights 148, in bearings of which the shaft 149 is mounted. A frame 150 is pivotally mounted upon the shaft 149, and in one end of the frame in bearings thereof a shaft 151 is mounted. The shafts 149 and 151 carry sprockets 152 and 153, engaged by a conveyer 154 similar to the transferring conveyer. This conveyer, owing to the frame 150 being pivoted, at one end bears on the transferring conveyer by gravitation, and acts to flatten out the loose reeds or grass, so that the same may easily pass between the crushing rolls of the combined crusher and shredder. On one end of the shaft 149 a pulley 155 is mounted, which is engaged by a belt 156, which in turn engages a pulley 157 on one end of the shaft of one of the upper crushing rolls 63, whereby power is transmitted to the conveyer 154. On one end of the shaft 144 a pulley 158 is carried, and is engaged by a belt 159, which in turn passes about a pulley 160 on one end of the shaft of one of the lower crushing rolls of the combined crusher and shredder, so as to transfer power to the conveyer 113. In the operation of the machine, the engine is started, it being obvious that the caterpillar tractor drive having been put in motion, and by throwing the friction cone gears in clutch, the various foregoing mechanisms will be put in motion. The cutting mechanism will then harvest swamp grass, such as reeds and the like, cutting them at the desired height above the roots, the grass will fall upon conveyer 112, and be transferred to the combined crusher and shredder, thereby being treated, and then drawn from the shredder and discharged to the rear of the machine into a trailer (not shown). Owing to the large area of the caterpillar tractor drive and the form of construction, the machine will traverse the swampy land without injuring or destroying the roots of the plants.

The harvester may be propelled forwardly during a harvesting operation in any suitable manner, for instance by an engine. However, it has been found that the forward movement of the harvester may be accomplished by what is known as poling, which consists of having a man on each side of the harvester with a pole, which pole is placed in engagement with the bottom of the lake or stream so that the harvester may be moved forwardly during a harvesting operation. During this forward movement if the harvester hits the bottom of the lake or stream or enters shoal water the pontoon carried tractoring means will carry the harvester forwardly.

The invention having been set forth, what is claimed as new and useful is:—

1. In a swamp harvester, the combination with a main frame, of an auxiliary frame connected to the forward end thereof and provided with a harvesting mechanism and an elevating conveyer, a combined crusher and shredder on the main frame, transferring means between the combined crusher and shredder and said conveyer, a mechanism for withdrawing the shredded material from the shredder and discharging it rearwardly, said main frame having endless traction means, and unitary means for operating the traction means and the aforesaid mechanisms.

2. In a swamp harvester the combination with a frame provided with a harvesting mechanism at its forward end and a conveyer adjacent thereto, of a combined crusher and shredder on said frame, a conveyer between the combined crusher and shredder and the first conveyer for transferring the harvested material to the combined crusher and shredder, and a gravity actuated conveyer over the transferring conveyer for flattening the material in a compact mass whereby it may enter the combined crusher and shredder.

3. In a swamp harvester the combination with a frame provided with a harvesting mechanism at its forward end and a conveyer adjacent thereto, of a combined crusher and shredder on said frame, a conveyer between the combined crusher and shredder and the first conveyer for transferring the harvested material to the combined crusher and shredder, and a gravity actuated conveyer over the transferring conveyer for flattening the material in a compact mass whereby it may enter the combined crusher and shredder, and unitary operating means for the aforesaid elements.

4. In a swamp harvester, the combination with a main frame, of an auxiliary frame pivotally connected to the forward end thereof and provided with a harvesting mechanism and an elevating conveyer, means whereby said pivoted frame and elevating conveyer may have its free end held in various vertical positions, a combined crusher and shredder on the main frame, transferring means between the combined crusher and shredder and said conveyer, a mechanism for withdrawing the shredded material from the harvester and discharging it rearwardly, said main frame having endless traction means, and unitary means for operating the traction means and the aforesaid mechanisms.

5. In a swamp harvester the combination with a frame provided with a harvesting mechanism at its forward end and an upwardly and rearwardly extending conveyer adjacent thereto, of a combined crusher and shredder on said frame, a conveyer between the combined crusher and shredder and the first conveyer for transferring the harvested material to the combined crusher and shredder, and a gravity actuated conveyer inclined downwardly and rearwardly and disposed over the transferring conveyer for flattening the material into a compact mass whereby it may enter the combined crusher and shredder.

6. In a swamp harvester the combination with a frame provided with a harvesting mechanism at its forward end and a conveyer adjacent thereto, of a combined crusher and shredder on said frame, a conveyer between the combined crusher and shredder and the first conveyer for transferring the harvested material to the combined crusher and shredder and an inclined conveyer gravity actuated and disposed over the transferring conveyer thereby forming a wedge shaped passage through which the material is forced and compressed before entering the crusher and shredder, said gravity actuation preventing the jamming of the material between the transferring conveyers and unitary operating means for the aforesaid element.

In testimony whereof I have signed my name to this specification in the presence of two subscribing witnesses.

HARRY ELLWOOD ELLIS.

Witnesses:
GEORGE CLARK,
RUTH BOURLAY.